US012669329B2

(12) United States Patent
Wenzel et al.

(10) Patent No.: US 12,669,329 B2
(45) Date of Patent: Jun. 30, 2026

(54) APPARATUS AND METHOD FOR AREA MAPPING

(71) Applicant: SAM—DIMENSION GMBH, Stuttgart (DE)

(72) Inventors: Konrad Wenzel, Stuttgart (DE); Alexander Linn, Ostfildern (DE); Robin Mink, Stuttgart (DE)

(73) Assignee: SAM—DIMENSION GMBH, Stuttgart (DE)

( * ) Notice: Subject to any disclaimer, the term of this patent is extended or adjusted under 35 U.S.C. 154(b) by 0 days.

(21) Appl. No.: 18/269,079

(22) PCT Filed: Dec. 14, 2021

(86) PCT No.: PCT/DE2021/100997
§ 371 (c)(1),
(2) Date: Jun. 22, 2023

(87) PCT Pub. No.: WO2022/135632
PCT Pub. Date: Jun. 30, 2022

(65) Prior Publication Data
US 2024/0044645 A1     Feb. 8, 2024

(30) Foreign Application Priority Data

Dec. 22, 2020     (DE) ..................... 10 2020 134 736.7

(51) Int. Cl.
*G01C 11/02*          (2006.01)
*G01S 19/01*          (2010.01)
(Continued)

(52) U.S. Cl.
CPC .............. *G01C 11/02* (2013.01); *G01S 19/01* (2013.01); *G03B 15/006* (2013.01); *G03B 37/04* (2013.01); *G06T 3/4038* (2013.01)

(58) Field of Classification Search
CPC ....... G01C 11/02; G01S 19/01; G03B 15/006; G03B 37/04; G03B 17/38; G03B 19/023; G06T 3/4038
See application file for complete search history.

(56) References Cited

U.S. PATENT DOCUMENTS 9,836,668 B2 *  12/2017  Ikeda ...................... G06F 18/22
10,621,433 B1 *  4/2020  Guglielmo .......... A01M 31/002
(Continued)

FOREIGN PATENT DOCUMENTS

CN          105339758 A       2/2016
EP            2277130 B1     11/2016

OTHER PUBLICATIONS

International Search Report dated Mar. 25, 2022 issued in PCT/DE2021/100997.
(Continued)

*Primary Examiner* — Timothy R Newlin
(74) *Attorney, Agent, or Firm* — Jordan IP Law, LLC

(57)          ABSTRACT

The invention relates to an apparatus (1) and a method for area mapping, wherein the apparatus (1) for area mapping includes a framework having a main camera (2) and/or a main sensor attached to the framework, and at least two auxiliary cameras (3) and/or auxiliary sensors attached to the framework, wherein the main camera (2) and/or the main sensor as well as the at least two auxiliary cameras (3) and/or the at least two auxiliary sensors have a defined camera footprint (8, 9) on the ground and a defined ground image resolution, wherein the camera footprint (8) of the auxiliary cameras (3) and/or auxiliary sensors on the ground is smaller than the camera footprint (9) of the main camera (2) and/or of the main sensor on the ground and lies at least partially within same, and the ground image resolution of the auxiliary cameras (3) and/or auxiliary sensors is greater than the ground image resolution of the main camera (2) and/or of the
(Continued)

Figure 1:
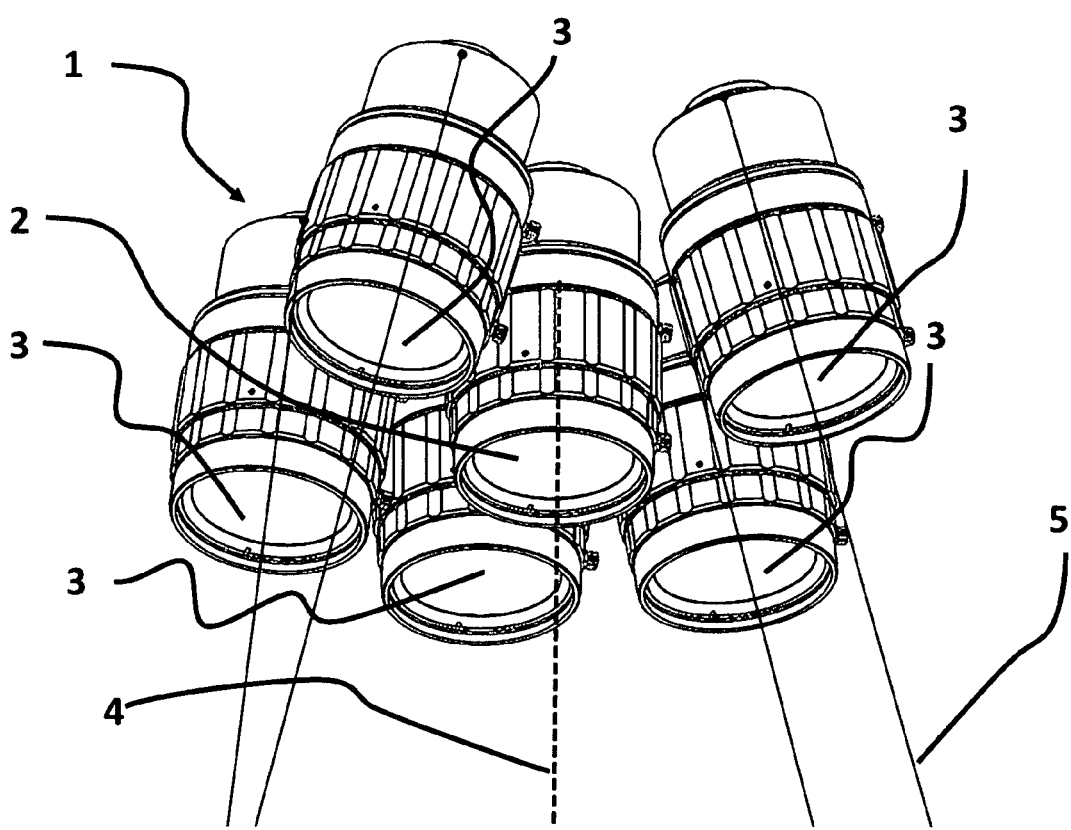

main sensor, and the auxiliary cameras (3) and/or auxiliary sensors are aligned such that images generated by the auxiliary cameras (3) and/or auxiliary sensors at least partially overlap, and the area mapping apparatus (1) has at least one GNSS receiver and a trigger mechanism, wherein the GNSS receiver, the main camera (2) and/or the main sensor and the at least two auxiliary cameras (3) and/or auxiliary sensors are coupled to the trigger mechanism, as a result of which quick creation of high-resolution, georeferenced orthomosaic images of areas and high area coverage is made possible.

12 Claims, 3 Drawing Sheets

(51) Int. Cl.
| | | |
|---|---|---|
| *G03B 15/00* | (2021.01) | |
| *G03B 37/04* | (2021.01) | |
| *G06T 3/4038* | (2024.01) | |

(56) References Cited

U.S. PATENT DOCUMENTS

| | | | | |
|---|---|---|---|---|
| 10,681,338 | B1 * | 6/2020 | Chen | H04N 13/296 |
| 11,536,857 | B2 * | 12/2022 | Best | G01C 15/06 |
| 2004/0114038 | A1 * | 6/2004 | Louis | H04N 7/181 |
| | | | | 348/E7.086 |
| 2010/0235095 | A1 * | 9/2010 | Smitherman | G03B 37/04 |
| | | | | 702/94 |
| 2011/0069154 | A1 * | 3/2011 | Case | G01N 21/9501 |
| | | | | 348/46 |
| 2011/0122223 | A1 * | 5/2011 | Gruber | G01C 11/025 |
| | | | | 348/222.1 |
| 2014/0375773 | A1 * | 12/2014 | He | G01C 11/06 |
| | | | | 348/47 |
| 2015/0054913 | A1 * | 2/2015 | Annau | G06Q 30/0246 |
| | | | | 348/36 |
| 2015/0248584 | A1 * | 9/2015 | Greveson | G06T 7/73 |
| | | | | 382/113 |
| 2016/0150142 | A1 * | 5/2016 | Lapstun | B64D 47/08 |
| | | | | 348/36 |
| 2016/0327950 | A1 * | 11/2016 | Bachrach | G05D 1/0094 |
| 2017/0291704 | A1 * | 10/2017 | Alegria | G01S 15/02 |
| 2018/0091797 | A1 * | 3/2018 | Armatorio | H04N 13/246 |
| 2018/0227500 | A1 * | 8/2018 | Jamula | G03B 11/045 |
| 2019/0394404 | A1 * | 12/2019 | Becker | H04N 23/45 |
| 2020/0159252 | A1 * | 5/2020 | Giuffrida | G01S 17/894 |
| 2021/0051311 | A1 * | 2/2021 | Lapstun | H04N 13/243 |
| 2022/0256834 | A1 * | 8/2022 | Lopes Agnese | G06T 7/0012 |
| 2024/0370971 | A1 * | 11/2024 | Arar | G06T 3/4038 |

OTHER PUBLICATIONS

Fernandez-Quintanilla, C. et al., "Is the current state of the art of weed monitoring suitable for site-specific weed management in arable crops?", Weed Research (Feb. 2018), 58, 259; DOI: 10.1111/wre.12307.

Mink, Robin et al., "Multi-Temporal Site-Specific Weed Control of *Cirsium arvense* (L.) Scop. and *Rumex crispus* L. in Maize and Sugar Beet Using Unmanned Aerial Vehicle Based Mapping", Agriculture (2018), 8, 65; doi:10.3390/agriculture8050065, pp. 1-14.

Wenzel, Konrad et al., "High-Resolution Surface Reconstruction From Imagery for Close Range Cultural Heritage Applications", International Archives of the Photogrammetry, Remote Sensing and Spatial Information Sciences, vol. XXXIX-B5, 2012 XXII ISPRS Congress, Aug. 25-Sep. 1, 2012, Melbourne, Australia, pp. 133-138.

First Office Action for CN Application No. 202180094081.4, dated Apr. 21, 2026, six pages.

* cited by examiner

Fig. 2

APPARATUS AND METHOD FOR AREA MAPPING

STATE OF THE ART

The invention relates to an apparatus for area mapping and to a method for area mapping, in particular to a method for the rapid generation of high-resolution, georeferenced images of areas by means of an apparatus including a plurality of cameras.

Methods for area mapping have known for a long time. Today, in addition to classic GNSS-based surveying methods, satellite or aerial photogrammetry is used to generate orthomosaic images, distortion-corrected overview images, from several overlapping images of large areas. A disadvantage of the known methods of aerial photogrammetry for area mapping is that they are usually carried out from a high altitude (for example, from airplanes), which has a negative effect on the image ground resolution, or, if the images are taken at high resolution and then from a low altitude (for example, from drones), the images have a low image size, which leads to the need to take a large number of images, thus generating very large amounts of data. Cameras and sensors that have sufficient resolution and appropriate image size are often not able to achieve a necessary triggering speed to efficiently take contiguous images or sensor measurements.

Area mapping for weed monitoring has shown its potential in recent years, especially in the field of agriculture. Fernandez-Quintanilla et al. (European Weed Research Society 2018, 58, 259; DOI: 10.1111/wre.12307) provide an overview of corresponding application examples. Furthermore, Mink et al. (Agriculture 2018, 8, 65; D01:10.3390/agriculture8050065) describe a device and method for mapping weed by drone photogrammetry. A disadvantage of this prior art is the large amount of data to be processed.

Devices using multiple cameras are known from photogrammetry. For example, Wenzel et al. (International Archives of the Photogrammetry, Remote Sensing and Spatial Information Sciences, Volume XXXIX-B5, 2012; DOI: 10.5194/isprsarchives-XXXIX-B5-133-2012) describe a multi-camera system for generating 3-dimensional models, where the system has a main camera for capturing large-scale images and auxiliary cameras for the detailed images. A disadvantage of this system is that it is designed for small-structured, highly detailed images.

The patent EP 2 277 130 B1 discloses a method for capturing images from one or more moving platforms for remote sensing of a large area, in which overview images and detail images are captured and thus, via bundle block adjustment and using identified pixels in the overview images and the detail images, detailed orthomosaic images are generated from the photogrammetric calculation of the detail images. A disadvantage of this method is that the inner and outer orientation is done using identified pixels in the overview images and the detail images, which requires a high computational effort.

It is an object of the invention to provide an apparatus and a method for area mapping that overcome at least some of the problems in the art.

The Invention and its Advantages

The apparatus for area mapping according to the invention, and the method for area mapping according to the invention, have the advantage that the apparatus for area mapping includes a framework having a main camera and/or a main sensor attached to the framework, and at least two auxiliary cameras and/or auxiliary sensors attached to the framework, wherein the main camera and/or the main sensor as well as the at least two auxiliary cameras and/or the at least two auxiliary sensors have a defined camera footprint on the ground and a defined ground image resolution, wherein the camera footprint of the auxiliary cameras and/or auxiliary sensors on the ground is smaller than the camera footprint of the main camera and/or of the main sensor on the ground and lies at least partially within the same, and the ground image resolution of the auxiliary cameras and/or auxiliary sensors is greater than the ground image resolution of the main camera and/or of the main sensor, and the auxiliary cameras and/or auxiliary sensors are aligned or oriented such that images generated by the auxiliary cameras and/or auxiliary sensors at least partially overlap, and the apparatus for area mapping has at least one GNSS (global navigation satellite system) receiver and a trigger mechanism, wherein the GNSS receiver, the main camera and/or the main sensor and the at least two auxiliary cameras and/or auxiliary sensors are coupled to the trigger mechanism, thereby enabling a faster generation of high-resolution, georeferenced images of areas and thereby achieving a higher area performance compared to the prior art. The at least one auxiliary camera could be a common industrial camera. The main camera and/or the main sensor and/or at least one auxiliary camera and/or at least one auxiliary sensor could be movably attached to the framework. Accordingly, a tilting and/or rotating movement could be performed so that at least one camera and/or at least one sensor is moved individually or together with at least one other camera and/or sensor. Furthermore, this movement could be carried out manually and/or automatically and simultaneously and/or with a time delay by means of a remote control.

In a preferred embodiment of the apparatus for area mapping, the auxiliary cameras and/or auxiliary sensors are aligned in such a way that an image generated by an auxiliary camera and/or an auxiliary sensor overlaps at at least one edge with an image generated by another auxiliary camera and/or another auxiliary sensor and at an edge, at which it does not overlap with the generated image of another auxiliary camera and/or another auxiliary sensor, adjoins an image recorded by another auxiliary camera and/or another auxiliary sensor, or adjoins an edge of the main camera and/or the main sensor.

In a preferred embodiment of the apparatus for area mapping, the auxiliary cameras and/or auxiliary sensors are aligned or oriented in such a way that the overlap of the generated images is small.

In a preferred embodiment of the apparatus for area mapping, the auxiliary cameras and/or auxiliary sensors are aligned or oriented such that the overlap of the generated images is less than 10% and/or greater than 1%, preferably greater than 5%.

In a preferred embodiment of the apparatus for area mapping, the camera footprint of the main camera and/or the main sensor on the ground is greater than 5% of the sum of the camera footprints of the auxiliary cameras and/or auxiliary sensors on the ground. Furthermore, the camera footprint of the main camera and/or the main sensor on the ground could be greater than 10%, preferably greater than 50%, in particular greater than 70% of the sum of the camera footprints of the auxiliary cameras and/or auxiliary sensors on the ground.

In a preferred embodiment of the apparatus for area mapping, the apparatus for area mapping according to the invention includes at least one IMU sensor.

In a preferred embodiment of the apparatus for area mapping, the trigger mechanism triggers the main camera and/or the main sensor and the at least two auxiliary cameras and/or auxiliary sensors simultaneously or with a defined time offset.

In a preferred embodiment of the apparatus for area mapping, the trigger mechanism simultaneously determines or defines with a time offset an exact position of the apparatus via at least one GNSS receiver and/or data on the rotation of the apparatus via at least one IMU sensor and documents it.

In a preferred embodiment of the apparatus for area mapping, the GNSS receiver is a GPS, GLONASS, GALILEO and/or BEIDOU receiver. Furthermore, the position data could be acquired via standard GNSS signals and antennas or by real-time kinematics or differential GNSS, or similar methods.

In a preferred embodiment of the apparatus for area mapping, the apparatus for area mapping includes at least one attachment means for attachment to a manned or unmanned flying object, such as an airplane, a helicopter or a drone, and/or to a guide, such as a rail. The total weight of the apparatus could be less than 5 kg, allowing transport by an unmanned flying object, such as a drone. Furthermore, the attachment means could be movable, allowing the apparatus to be pivoted and/or rotated in any direction. Furthermore, this pivoting and/or rotating could be controlled manually and/or automatically by a remote control.

In a preferred embodiment of the apparatus for area mapping, the apparatus for area mapping includes at least one movable connecting element, wherein the movable connecting element connects the framework and at least one fastening means for fastening to a manned or unmanned flying object, such as an aircraft, a helicopter or a drone, and/or to a guide, such as a rail, a pulley or the like. The movable connecting element could be a hinge attached to a frame mounted to, for example, the gimbal of a drone by means of a fastener. Furthermore, a piezo actuator and/or a motor could be attached to the frame, which moves the hinge and thus tilts the apparatus and thus the cameras and/or sensors. In this regard, the movement could be manually controlled and/or automatically controlled and/or remotely controlled.

In a preferred embodiment of the apparatus for area mapping, the apparatus for area mapping includes a second main camera and/or a second main sensor. The second main camera and/or the second main sensor could be aligned or oriented in such a way that an image area recorded by it at least partially overlaps with or is adjacent to an image area recorded by the first main camera and/or the first main sensor and has a different viewing angle. Furthermore, the overlap of the image areas could be at least 50%. Several main cameras and/or main sensors could each have different viewing angles and overlapping areas.

In a preferred embodiment of the apparatus for area mapping, the apparatus for area mapping includes at least one storage module, at least one transmitter device and/or at least one data processing module. The at least one transmitting device could be a Bluetooth transmitter, a radio transmitter and/or a data cable. Furthermore, the data processing module could be a Single Board Computer (SBC) or a similar small computing unit for edge computing, whereby the recorded images can be processed, for example, directly on the drone and already pre-processed data and even final data products such as orthomosaic images or evaluated data, for example, in the form of application maps or vegetation maps, could be generated by the apparatus.

According to an advantageous embodiment of the method for area mapping according to the invention, by means of a trigger mechanism of a recording apparatus, a main camera and/or a main sensor are triggered simultaneously or with a defined time offset with at least two auxiliary cameras and/or at least two auxiliary sensors, the main camera and/or the main sensor as well as the at least two auxiliary cameras and/or the at least two auxiliary sensors having a defined camera footprint on the ground and a defined image ground resolution, wherein the camera footprint of the auxiliary cameras and/or auxiliary sensors on the ground is smaller than the camera footprint of the main camera and/or of the main sensor on the ground and lies at least partially within it, and the image ground resolution of the auxiliary cameras and/or auxiliary sensors is greater than the image ground resolution of the main camera and/or of the main sensor, and the auxiliary cameras and/or auxiliary sensors are aligned in such a way that images generated by the auxiliary cameras and/or auxiliary sensors at least partially overlap, so that from the images of the auxiliary cameras and/or auxiliary sensors, the image of the main camera and/or of the main sensor can be composed and at the same time data on the position and rotation of the recording apparatus are precisely determined and the recorded images are at least partially georeferenced by the determined data on the position and rotation of the recording apparatus and the trigger mechanism is triggered several times in succession and thus several recordings are made in succession by at least one camera.

In a preferred embodiment of the method for area mapping, the recording apparatus is moved in a movement direction.

In a preferred embodiment of the method for area mapping, the trigger mechanism is triggered several times such that the recorded images of the main camera and/or the main sensor overlap in the movement direction.

In a preferred embodiment of the method for area mapping, the overlap of the recorded images of the main camera and/or the main sensor in the movement direction is less than 80% and/or more than 30%.

In a preferred embodiment of the method for area mapping, if a laterally offset image has already been previously recorded with the main camera and/or the main sensor, the subsequently recorded image of the main camera and/or the main sensor at least partially overlaps therewith.

In a preferred embodiment of the method for area mapping, the overlap of the subsequently recorded image of the main camera and/or the main sensor with the laterally offset recorded image of the main camera and/or the main sensor is more than 20%. The overlap could be more than 50%, preferably more than 60%.

In a preferred embodiment of the method for area mapping, the recording apparatus is tilted, rotated and/or pivoted relative to the movement direction during movement in the movement direction. The tilting, rotating or pivoting movement could be manually controlled and/or automatically controlled and/or remotely controlled.

In a preferred embodiment of the method for area mapping, the recorded images are georeferenced by the determined data on the position and rotation of the recording apparatus.

In a preferred embodiment of the method for area mapping, an orthomosaic image is generated from the recorded images of the main camera and/or the main sensor by means of photogrammetric calculations.

In some embodiments, the orthomosaic image could be georeferenced using the position data. The georeferencing of the orthomosaic image could be performed using a Structure-from-Motion Technique (SfM technique). A correction of the GNSS error could be done. Furthermore, the accuracy of the acquired GNSS positions of the individual images could be increased by bundle block adjustment performed as part of the photogrammetric evaluation.

In a preferred embodiment of the method for area mapping, the georeferencing of the recorded images of the auxiliary cameras and/or auxiliary sensors is performed based on a calibration of an orientation of the auxiliary cameras and/or auxiliary sensors relative to the main camera and/or main sensor and the georeferenced images of the main camera and/or main sensor and/or the georeferenced orthomosaic image of the main camera and/or main sensor.

In a preferred embodiment of the method for area mapping, the calibration is performed by measuring the camera footprints of the aligned auxiliary cameras and/or auxiliary sensors in the camera footprint of the main camera and/or main sensor.

In a preferred embodiment of the method for area mapping, an orthomosaic image or a georeferenced map of the evaluated data is generated from the recorded images of the auxiliary cameras and/or auxiliary sensors via photogrammetric calculations.

In a preferred embodiment of the method for area mapping, the orthomosaic image generated by the auxiliary cameras and/or auxiliary sensors is georeferenced by comparison with the georeferenced orthomosaic image generated by the main camera and/or main sensor.

In a preferred embodiment of the method for area mapping, the position data originate from a GNSS receiver and/or control points.

In a preferred embodiment of the method for area mapping, the recording apparatus is moved by a manned or unmanned flying object, such as an aircraft, a helicopter and/or a drone, or along a guide, such as a rail, a pulley or the like. At least two recording apparatuses could be moved simultaneously by a manned or unmanned flying object, such as an aircraft, a helicopter and/or a drone, or along a guide, such as a rail, a pulley or the like. Furthermore, the drone could be a wing drone.

In a preferred embodiment of the method for area mapping, the position data originates from a GNSS receiver attached to the recording apparatus and/or the aircraft, helicopter, drone or guide.

In a preferred embodiment of the method for area mapping, the generated data and/or images are saved on at least one storage module after acquisition and/or are transmitted to at least one external data storage device via at least one transmission device.

In a preferred embodiment of the method for area mapping, the evaluation of the georeferenced orthomosaic images or individual images is carried out by means of trained artificial intelligence (K1). The method according to the invention could be used for sampling, surveying and/or monitoring in agriculture and/or forestry, in particular for monitoring disease and pest infestation, weed infestation, plant health, for counting plants, for recording vegetation density and game damage and/or for monitoring. Furthermore, it would also be possible that weeds are identified and mapped in the georeferenced orthomosaic images and subsequently herbicide application maps for field sprayers are created from them. Furthermore, the method according to the invention could be used for surveying, inspection and/or assessment of industrial plants, open-cast mines, construction sites, railroad and/or power lines, or also for monitoring gas pipelines.

In a preferred embodiment of the method for area mapping, an apparatus described herein is used as the recording apparatus.

Further advantages and beneficial embodiments of the invention are provided in the following description, claims and drawings.

DRAWINGS

Preferred embodiments of the invention are shown in the drawings and are explained in more detail below.

Figure 3:
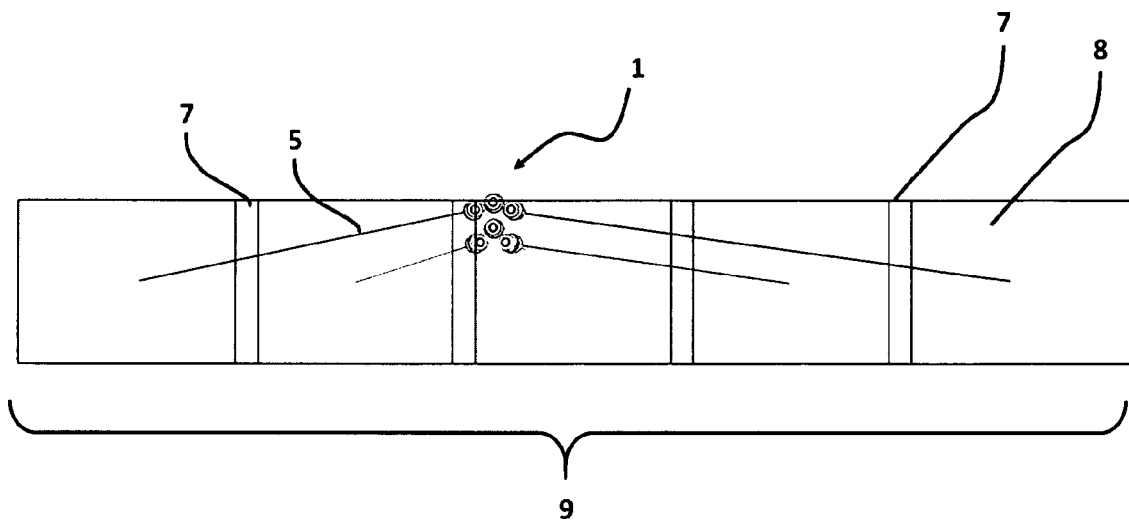

FIG. 1 shows an apparatus for area mapping according to the invention,

Figure 2:
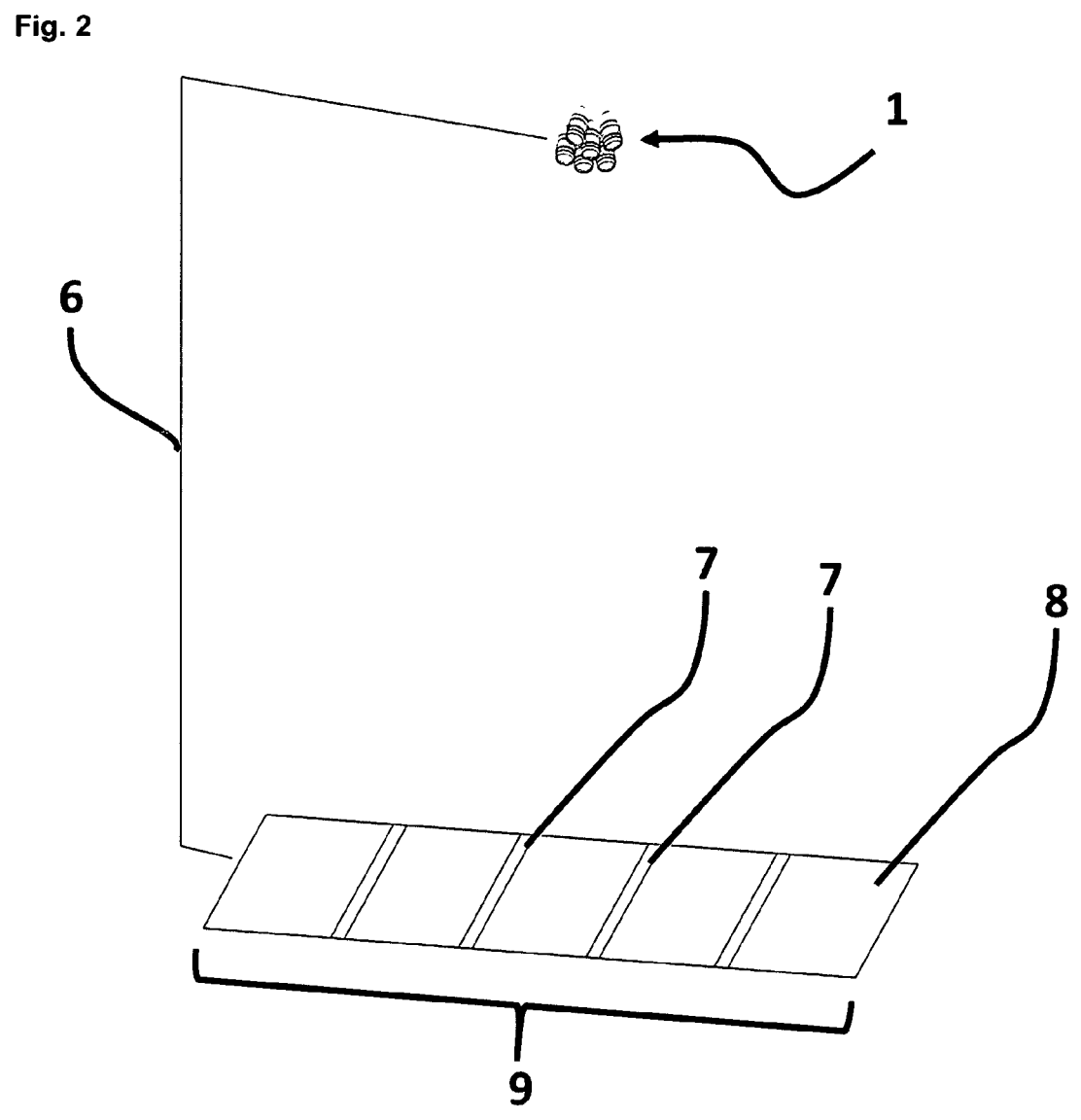

FIG. 2 shows a side view of the overlaps of the camera footprints of the auxiliary cameras and the main camera on the ground at a defined ground distance and used in the method of the invention with the apparatus of FIGS. 1, and FIG. 3 shows a top view of the overlaps of the camera footprints of the auxiliary cameras and the main camera on the ground used in the method of the invention with the apparatus of FIG. 1.

DESCRIPTION OF EMBODIMENTS

FIG. 1 shows an apparatus 1 for area mapping according to the invention, the apparatus 1 including a main camera 2 and auxiliary cameras 3, wherein a viewing direction 4 of the main camera 2 and viewing directions 5 of the auxiliary cameras 3 are shown. The main camera 2 and the auxiliary cameras 3 are attached to a framework that is not shown. The apparatus 1 according to the invention could also be attached to a drone by at least one attachment means and could be moved by the drone.

FIG. 2 shows a side view of the overlaps 7 of the camera footprints 8 of the auxiliary cameras 3 and the camera footprint 9 of the main camera 2 on the ground at a defined ground distance 6 and used in the method of the invention with the apparatus 1 of FIG. 1, wherein in the illustrated example the camera footprint 9 of the main camera 2 is shown in such a way that the sum of the camera footprints 8 of the auxiliary cameras 3 on the ground coincides with the camera footprint 9 of the main camera 2. Preferably, the sum of the camera footprints 8 of the auxiliary cameras 3 on the ground coincides with the camera footprint 9 of the main camera 2 only partially. The main camera 2 and the auxiliary cameras 3 are attached to a framework that is not shown.

Preferably, a movement direction of the apparatus 1 in the illustrated embodiment is orthogonal to the long side of the camera footprint 9 of the main camera 2, with the lateral overlap 7 of the camera footprints 8 of the auxiliary cameras 3 shown in FIG. 2 completely filling the camera footprint 9 of the main camera 2 laterally.

For example, if the apparatus 1 according to the invention is moved in the preferred movement direction and the trigger mechanism is triggered several times in succession, images are generated which reproduce the camera footprint 9 of the main camera 2, wherein the offset of the images and thus the overlap of the images in the movement direction depend on how quickly the apparatus 1 is moved. If the position and rotation of the apparatus 1 is then determined in parallel with the triggering of the main camera 2, a georeferenced orthomosaic image can be created based on several captured images of the main camera 2 and the position data of the individual images via photogrammetric calculations, which, however, does not have a high image ground resolution if the ground distance 6 is appropriate. If, in this case, the auxiliary cameras 3 were triggered at the same time as the main camera 2 or with a time delay and high-resolution images with a significantly smaller camera footprint 8 were taken, these high-resolution images of the auxiliary cameras 3 can, if the camera footprints 8 of the auxiliary cameras 3 were previously correlated with the camera footprint 9 of the main camera 2, also be georeferenced on the basis of the georeferenced orthomosaic image generated with the main camera 2. For mapping a large area, for example, a drone could carry the apparatus 1 along a pre-programmed path over the area so that it is scanned. By using the apparatus 1 in the method according to the invention, a large area can be imaged and georeferenced at high resolution in significantly less time than would be possible using the current state of the art. By using multiple auxiliary cameras 3 with small camera footprints 8 on the ground but high image ground resolution, the overall resolution of the georeferenced orthomosaic images can be increased to the maximum resolution capability of the individual auxiliary cameras 3 and a trade-off between image ground resolution and area performance or duration is no longer necessary, thereby significantly reducing the overall time required to create high resolution georeferenced area images. A further increase in performance can be achieved, for example, by the simultaneous use of multiple apparatuses 1 arranged in parallel. For example, weed could thus be identified and mapped by an algorithm in high-resolution, georeferenced area images of agricultural land, in order to subsequently generate herbicide application maps. In order to correct the flight speed or to avoid strongly blurred images during the recording, in an embodiment of the method according to the invention, for motion compensation, the recording apparatus could be tilted, for example, so that the viewing direction 4 of the main camera 2 and the viewing directions 5 of the auxiliary cameras 3 change in such a way that the camera footprint 9 of the main camera 2 on the ground and the camera footprints 8 of the auxiliary cameras 3 do not change. In addition, it would also be possible to perform the motion compensation using digital methods, such as the Time Delayed Integration (TDI) or Forward Motion Compensation (FMC) method.

FIG. 3 shows a top view of the overlaps 7 of the camera footprints 8 of the auxiliary cameras 3 and the camera footprint 9 of the main camera 2 on the ground used in the method of the invention with the apparatus 1 of FIG. 1.

All of the features shown here can be essential to the invention either individually or in any combination with each other.

LIST OF REFERENCE SIGNS

1 apparatus
2 main camera
3 auxiliary camera
4 viewing direction (main camera)
5 viewing direction (auxiliary camera)
6 ground distance
7 overlap
8 camera footprint (auxiliary camera)
9 camera footprint (main camera)

The invention claimed is:

1. A method for area and plant mapping implemented with an apparatus, the method comprising:
   a) providing a main sensor and at least two auxiliary sensors that are arranged in a circle around the main sensor with the main sensor being disposed at a center of the circle, wherein the main sensor has a main camera footprint on the ground and a main image ground resolution, and the at least two auxiliary sensors each have an auxiliary camera footprint on the ground and each having an auxiliary defined image ground resolution, the auxiliary camera footprints of the at least two auxiliary sensors on the ground being smaller than the main camera footprint of the main sensor on the ground, wherein the auxiliary camera footprints lie at least partially within the main camera footprint, wherein the auxiliary defined image ground resolutions of the auxiliary sensors are greater than the main image ground resolution of the main sensor, wherein the auxiliary sensors are aligned such that images generated by the auxiliary sensors are arranged in a linear direction and at least partially overlap, wherein the apparatus comprises at least one GNSS receiver and a trigger mechanism, wherein the GNSS receiver, the main sensor and the at least two auxiliary sensors are coupled to the trigger mechanism;
   b) triggering the trigger mechanism for (i) capturing images of the ground by the main sensor and (ii) determining position data for the images by means of the at least one GNSS receiver;
   c) triggering the trigger mechanism for capturing images of the ground by the at least two auxiliary sensors; and
   d) preprocessing of the images generated by the main sensor and the at least two auxiliary sensors, the preprocessing configured to generate georeferenced orthomosaic images from which plants can be identified and mapped.

2. The method for area and plant mapping according to claim 1, wherein the trigger mechanism in step b) and/or c) is triggered several times in succession and thus several images are taken in succession by at least one of the main and at least two auxiliary sensors.

3. The method for area and plant mapping according to claim 1, wherein the triggering mechanism in step b) and/or b) is triggered several times so that the images recorded with the main sensor overlap in a direction of movement of the apparatus.

4. The method for area and plant mapping according to claim 1, wherein the apparatus is tilted, rotated and/or pivoted relative to the direction of movement during the movement in the direction of movement.

5. The method for area and plant mapping according to claim 1, wherein, if a laterally offset recorded image has already been previously recorded with the main sensor laterally offset, the subsequent image recorded with the main sensor at least partially overlaps with the laterally offset recorded image.

6. The method for area and plant mapping according to claim 5, wherein the overlap of the subsequent image recorded with the main sensor with the laterally offset recorded image of the main sensor is more than 20%.

7. The method for area and plant mapping according to claim 1, wherein the orthomosaic images are generated from the images recorded with of the main sensor and/or the auxiliary sensors via photogrammetric calculations.

8. The method for area and plant mapping according to claim 1, wherein an orthomosaic image of the main sensor is georeferenced using the position data of the at least one GNSS receiver; and an orthomosaic image of the auxiliary sensors is georeferenced by comparison with the georeferenced orthomosaic image generated by the main sensor.

9. The method for area and plant mapping according to claim 1, wherein georeferencing of the images recorded by of the auxiliary sensors is performed based on a calibration of an orientation of the auxiliary sensors relative to the main sensor and georeferenced images of the main sensor and/or a georeferenced orthomosaic image of the main sensor.

10. The method for area and plant mapping according to claim 9, wherein the calibration is carried out by measuring the auxiliary camera footprints of the aligned auxiliary sensors in the main camera footprint of the main sensor.

11. A method for area and plant mapping according to claim 1, further comprising creating an herbicide application map for a field sprayer from the georeferenced orthomosaic images.

12. A method for area and plant mapping by means of an apparatus for area and plant mapping, the apparatus comprising a main sensor and at least two auxiliary sensors, wherein the main sensor has a main camera footprint on the ground and a main image ground resolution, and the at least two auxiliary sensors each have a defined camera footprint on the ground and each having an auxiliary defined image ground resolution, the auxiliary camera footprints of the at least two auxiliary sensors on the ground being smaller than the main camera footprint of the main sensor on the ground, wherein the auxiliary camera footprints lie at least partially within the main camera footprint, wherein the auxiliary defined image ground resolution of the auxiliary sensors are greater than the main image ground resolution of the main sensor, wherein the auxiliary sensors are aligned such that images generated by the auxiliary sensors are arranged in a linear direction and at least partially overlap, wherein the apparatus comprises at least one GNSS receiver and a trigger mechanism, wherein the GNSS receiver, the main sensor and the at least two auxiliary sensors are coupled to the trigger mechanism, wherein the method comprises:

a) triggering the trigger mechanism for (i) capturing images of the ground by the main sensor and (ii) determining position data for the images by means of the at least one GNSS receiver;

b) triggering the trigger mechanism for capturing images of the ground by the at least two auxiliary sensors; and c) preprocessing of the images generated by the main sensor and the at least two auxiliary sensors, the preprocessing configured to generate georeferenced orthomosaic images from which plants can be identified and mapped, wherein georeferencing of the images recorded by the auxiliary sensors is performed based on a calibration of an orientation of the auxiliary sensors relative to the main sensor and georeferenced images of the main sensor and/or a georeferenced orthomosaic image of the main sensor.

\* \* \* \* \*